(12) United States Patent  (10) Patent No.: US 9,049,341 B2
Yang  (45) Date of Patent: Jun. 2, 2015

(54) METHOD AND APPARATUS FOR VIDEO RESOURCE MANAGEMENT IN VIDEO CONFERENCE

(71) Applicant: Huawei Technologies Co., Ltd., Shenzhen, Guangdong (CN)

(72) Inventor: Fei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 14/081,764

(22) Filed: Nov. 15, 2013

(65) Prior Publication Data

US 2014/0078240 A1  Mar. 20, 2014

Related U.S. Application Data

(63) Continuation of application No. PCT/CN2011/080537, filed on Oct. 8, 2011.

(51) Int. Cl.
*H04N 7/15* (2006.01)
*H04M 3/56* (2006.01)
*H04L 12/18* (2006.01)
*H04L 29/06* (2006.01)

(52) U.S. Cl.
CPC .............. *H04N 7/15* (2013.01); *H04L 65/403* (2013.01); *H04M 3/567* (2013.01); *H04L 12/1827* (2013.01)

(58) Field of Classification Search
CPC .... H04N 7/15; H04L 12/1827; H04L 65/403; H04M 3/567

USPC .............. 348/14.01–14.16; 715/753; 709/204
See application file for complete search history.

(56) References Cited

U.S. PATENT DOCUMENTS

| 7,870,192 B2 * | 1/2011 | Greenlee et al. .............. 709/204 |
| 2006/0098085 A1 | 5/2006 | Nichols et al. |
| 2009/0037826 A1 | 2/2009 | Bennetts |
| 2010/0073454 A1 * | 3/2010 | Lovhaugen et al. ....... 348/14.03 |
| 2011/0157298 A1 | 6/2011 | Huang et al. |

FOREIGN PATENT DOCUMENTS

| CN | 1892563 A | 1/2007 |
| CN | 101099372 A | 1/2008 |

(Continued)

*Primary Examiner* — Melur Ramakrishnaiah
(74) *Attorney, Agent, or Firm* — Leydig, Voit & Mayer, Ltd.

(57) ABSTRACT

A method and apparatus for video resource management in a video conference is provided in embodiments of this invention. comprises: partitioning a display interface into a first display area, a second display area, a third display area; graphically representing a plurality of conference rooms participating in a video conference and presenting the plurality of graphical conference rooms participating in the video conference in the first display area; presenting a first graphical conference room comprising a first video resource, the first conference room being selected presented in the first display area; presenting the second graphical conference room in the third display area, the second conference rooms presented in the second display area. The embodiments of this invention may graphically represent video resources corresponding to screens or terminal video collecting apparatus in each conference room of a video conference, so that users can perceive situations in each conference room visually.

14 Claims, 11 Drawing Sheets

(56) References Cited

FOREIGN PATENT DOCUMENTS

| | | |
|---|---|---|
| CN | 101772957 A | 1/2010 |
| EP | 1739534 A2 | 1/2007 |
| GB | 2444580 A | 6/2008 |

* cited by examiner

METHOD AND APPARATUS FOR VIDEO RESOURCE MANAGEMENT IN VIDEO CONFERENCE

CROSS-REFERENCE TO RELATED APPLICATIONS

This application is a continuation of International Patent Application No. PCT/CN2011/080537, filed on Oct. 8, 2011, which is hereby incorporated by reference in its entirety.

TECHNICAL FIELD OF THE APPLICATION

The present invention relates to video communication field, and more specifically, to a method and apparatus for video resource management in a video conference.

BACKGROUND

Conference is a common activity in human communication. With the change in our working and live style, more and more conferences have to be held remotely, that is, between participants at different sites or in different conference rooms. For a better remote communication, people begin to conduct conferences through telephone or video communication.

Presently, the video conference has evolved to "telepresence" from the television conference at the beginning. The telepresence solution provides life-size image, ultra high definition video, stereophonic audio and specially designed environment. Telepresence is a new technology capable of creating a unique face-to-face experience in interaction between people and various locations and various aspects of working and life, which can be realized over network in conjunction with innovative video, audio, and interactive components (software and hardware).

In a telepresence conference, there may be one or three TV screens in a conference room. During a videoconference, people need to determine what to be displayed in particular in each video screen. For example, a videoconference is conducted at Beijing, Shanghai, and Shenzhen, and there are three TV screens in the Shenzhen conference room, participants at Shenzhen want to display images of Shenzhen, Beijing, and Shanghai on the three screens, respectively. A screen setting must be implemented, which usually requires a series of operations in a conference control system.

Generally, video devices in multiple conference rooms are connected to the same server, which sets image, audio for various conference rooms to meet requirements of people participating in the conference. With a networked computer, people can log in a video conference control website through a browser, on which various video devices in a conference can be listed in an interface, and various options can be provided for management.

However, in the above solution, people are unable to see directly which video resources are being watched in a certain conference room. Especially for telepresence conference, there may be a case where three screens are presented in a conference room. With such a solution, it is unable to directly see from which video resource the video content on the currently corresponding respective screens comes. Thus, the video resource to be viewed can be found through multiple unnecessary operations, resulting in low working efficiency.

SUMMARY OF THE APPLICATION

A method and apparatus for managing video resource visually in a video conference is provided in embodiments of this invention.

A method for video resource management in a video conference comprises: partitioning a display interface into a first display area, a second display area, and a third display area; graphically representing a plurality of conference rooms participating in a video conference and presenting the plurality of graphical conference rooms participating in the video conference in the first display area; presenting a first graphical conference room comprising a first video resource in the second display area, the first conference room being selected from the plurality of graphical conference rooms presented in the first display area; presenting a second graphical conference room comprising second video resource in the third display area, the second conference room being at least one of the plurality of graphical conference rooms presented in the first display area except for the graphical conference room that is selected and presented in the second display area, the second video resource presented in the third display area being used to create an association with the first video resource when being selected and moved to the second display area.

In another aspect, an apparatus for video resource management in a video conference is provided, which is characterized in comprising: a partition unit for partitioning a display interface into a first display area, a second display area, and a third display area; a presenting unit for graphically representing a plurality of conference rooms participating in a video conference and presenting the plurality of graphical conference rooms participating in the video conference in the first display area partitioned by the partition unit, and also for presenting a first graphical conference room comprising a first video resource in the second display area, the first conference room being selected from the plurality of graphical conference rooms presented in the first display area, and for presenting a second graphical conference room comprising a second video resource in the third display area, the second conference rooms being at least one of the plurality of graphical conference rooms presented in the first display area except for the graphical conference room that is selected and presented in the second display area, the second video resource presented in the third display area being used to create an association with the first video resource when being selected and moved to the second display area.

The embodiments of this invention may graphically represent video resources corresponding to screens or terminal video collecting apparatus in respective conference rooms of a video conference, so that users can perceive situations in the respective conference rooms visually, and working efficiency can be improved.

BRIEF DESCRIPTION OF THE DRAWINGS

For a more explicit description of the technical solutions of embodiments of this invention, a brief introduction of accompanying drawings to be used in the description of these embodiments will be given below. Obviously, accompanying drawings described below are merely some embodiments of this invention. For those skilled in the art, other accompanying drawings can be derived from these without any creative efforts.

DETAILED DESCRIPTION

In connection with the accompanying drawings of this invention, a clear, complete description will be given to the technical solutions of embodiments of this invention. Obviously, embodiments described herein are merely some embodiments of this invention, not all of them. Based on those embodiments of this invention, other embodiments can occur to those skilled in the art without any creative efforts, all of which fall within the scope of this invention.

Figure 1:
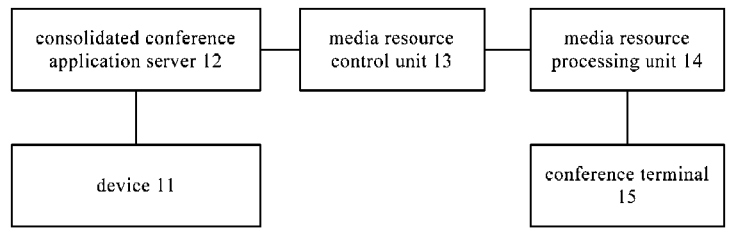
FIG. 1 is a schematic view of an application scenario of an embodiment of this invention.

FIG. 1 is a schematic view of an application scenario of an embodiment of this invention.

The scenario of FIG. 1 comprises: a device 11 for video resource management in a video conference, a consolidated conference application server 12, a media resource control unit 13, a media resource processing unit 14, and a conference terminal 15.

A user generally performs video conference resource management operation through a device 11, for example, a person computer or other smart device, such as a smart phone, a tablet computer, and other touch devices. The device 11 may usually communicate with a consolidated conference server 12 over a network; certainly, it also can be directly connected to the consolidated conference server 12 for communication. The device 11 may realize click and drag on graphic elements in a display interface through its own input module or an external input device to execute video resource management operations. The device 11 sends operation instructions of users to the consolidated conference server 12 through a network to effect a final conference control result.

The consolidated conference server 12 can provide conference services, including telepresence conference, high-definition conference, web (Internet) conference and/or audio conference; provide abundant terminal supports and allow conference access by any terminals.

The media resource control unit 13 can interpret resource control commands sent by the consolidated conference server 12, convert them into control commands of the media resource processing unit 14.

The media resource processing unit 14 can create audio and video media data stream to realize voice mixing, telepresence video or multi-picture, and other conference related media processing requirements, and support encoding and decoding conversion, bandwidth adaptation or bit rate adaptation, and other functions.

The conference terminal 15 can perform corresponding control on image and audio according to commands issued by the media resource processing unit to finally realize conference effects required by users. The conference terminal 15 comprises a screen for presenting video contents, and the screen is also called as a terminal display apparatus in the context and there can be a plurality of screens. The conference terminal 15 also comprises a terminal video collecting apparatus corresponding to the terminal display apparatus. Generally, number of the terminal display apparatus is in one-to-one correspondence to that of the terminal video collecting apparatus. Further, the conference terminal further comprises an audio collecting apparatus and an audio output apparatus, etc.

Figure 2:
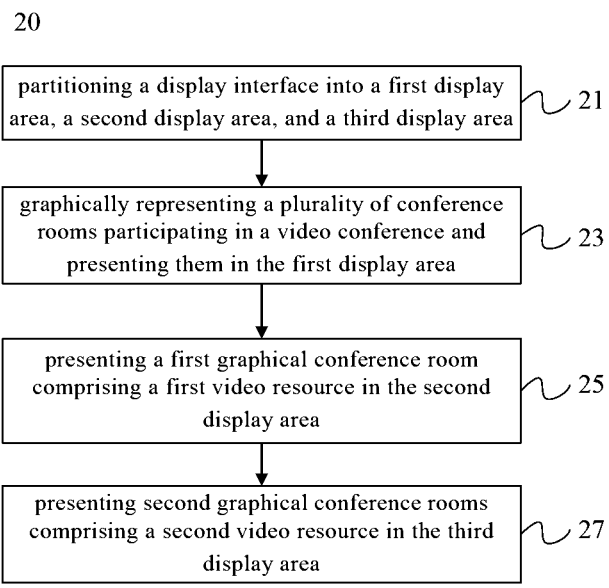
FIG. 2 is a flowchart of a method for video resource management in a video conference according to an embodiment of this invention.

FIG. 2 is a flowchart of a method 20 for video resource management in a video conference according to an embodiment of this invention.

The method 20 as shown in FIG. 2 comprises the following steps:

21: partitioning a display interface into a first display area, a second display area, and a third display area.

A display interface can be partitioned into a first display area, a second display area, and a third display area according to preset model parameters of a control interface.

23: graphically representing a plurality of conference rooms participating in a video conference and then presenting the plurality of graphical conference rooms participating in the video conference in the first display area.

A plurality of conference rooms participating in a video conference are graphically presented in the first display area.

25: presenting a first graphical conference room comprising a first video resource in the second display area, the first conference room being selected from the plurality of graphical conference rooms presented in the first display area.

The number of the first video resource comprised in the first graphical conference room corresponds to the number of the terminal display apparatus in the first conference room. The first graphical conference room comprises a plurality of the first video resources.

27: presenting a second graphical conference room comprising a second video resource in the third display area, the second conference room being at least one of the plurality of graphical conference rooms presented in the first display area except for the graphical conference room that is selected and presented in the second display area, wherein the second video resources presented in the third display area are used to create an association with the first video resource when being selected and moved to the second display area.

The number of the second video resource comprised in a second graphical conference room corresponds to the number of terminal video collecting apparatus in the second conference room. The second graphical conference room may comprise a plurality of the second video resources.

The embodiment of this invention may graphically represent resources corresponding to terminal display apparatus and terminal video collecting apparatus in respective conference rooms of a video conference, so that users can perceive situations in each conference room visually, and working efficiency can be improved.

Figure 3A:
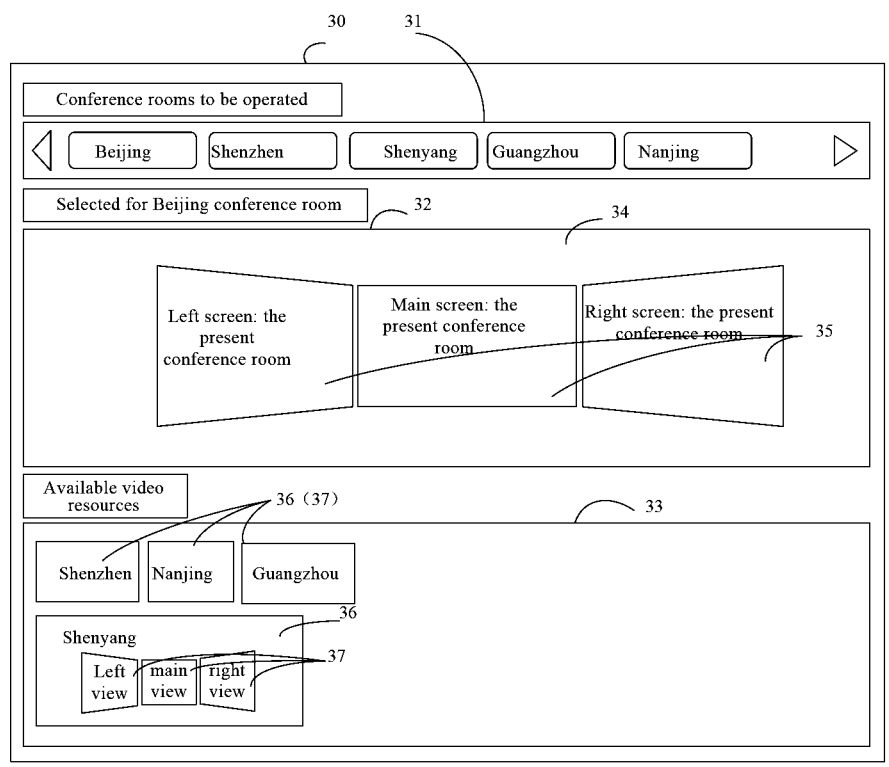
FIGS. 3A and 3B are schematic views of the method for video resource management in a video conference according to the embodiment of this invention.
Figure 3B:
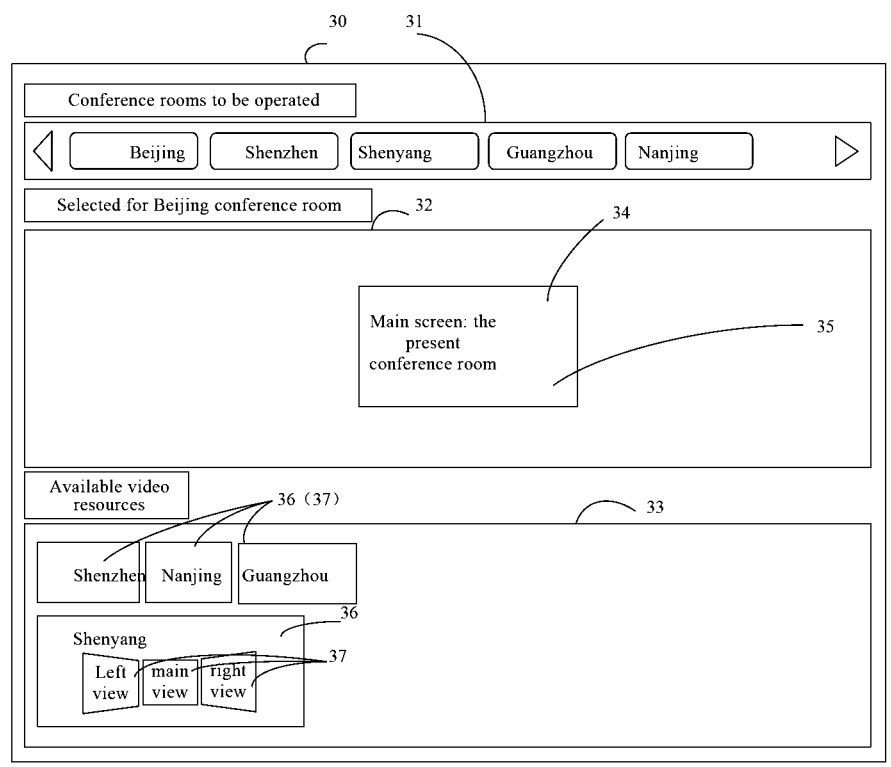

FIGS. 3A and 3B are schematic views of the method 20 for video resource management in a video conference according to the embodiment of this invention.

A display interface 30 is partitioned into a first display area 31, a second display area 32, and a third display area 33.

A plurality of graphical conference rooms are presented in the first display area 31. Beijing, Shenzhen, Shenyang, Guangdong, and Nanjing conference rooms participating in this conference are shown in this example, respectively.

When it is detected that a particular conference room is selected by a user, for example, the Beijing conference room, according to the actual situation of the conference room, the arrangement positions of each terminal display apparatus in the conference room are presented in the second display area 32, such as the left, main and right screens of FIG. 3A, or the main screen in FIG. 3B, and name of a terminal display apparatus displaying a video resource, that is, first video resource indicative information, as shown by the "the present conference room" in FIG. 3A or the "present conference room" in FIG. 3B, is also shown. That is, the second display area 32 comprises a first conference room 34 selected from a plurality of graphical conference rooms and a first video resource 35 contained therein. The selected first conference room 34 can be used for video resource management. The first video resource 35 corresponds to the video resource displayed on the terminal display apparatus of the first conference room 34, and there can be a plurality of the first video resources 35. As shown in FIG. 3A, this embodiment of the present invention comprises 3 first video resources 35, but this invention is limited thereto. When the first conference room 34 comprises only one first video resource 35, the first conference room 34 is merged with the first video resource 35, as shown in FIG. 3B. When no conference room is selected in the first display area 31, the second display area 32 can be blank. Certainly, as a different implementation, the second display area 32 may present a conference room where a user locates or a main conference room, as well as a first video resource 35 contained therein. When a specific conference room is selected from a plurality of conference rooms, the second display area then presents the selected first conference room 34 and the first video resource 35 contained therein.

The display interface 30 also presents optional video resources available to watch in addition to the first conference room 34, for example, comprising the name of a corresponding conference room and the name indicating the terminal video collecting apparatus of a video resource. That is, the third display area 33 comprises a graphical second conference room 36, which is one or more of the plurality of conference rooms except for the first conference room 34, i.e., one or more of the unselected conference rooms. Further, a second conference room 36 may comprise one or more second video resource(s) 37. When a second conference room 36 comprises only one second video resource 37, the second conference room 36 can be merged with the second video resource 37 in the display interface, for example, the Shenzhen, Nanjing, or Guangzhong conference room shown in FIGS. 3A and 3B. For example, the Shenyang conference room is a 3-screen telepresence conference room, then names indicating video resources taken by the three terminal video collecting apparatus of this conference room are displayed on three second video resources 37, as shown as the left, main and right views in FIGS. 3A and 3B.

Moreover, the presented first video resource 35 or second video resource 37 may comprise text or other distinguishable feature elements to prompt the name of a video resource displayed by a current terminal display apparatus or collected by a terminal video collecting apparatus, or a video resource name may be presented in combination with a preset standard picture or a real-time video resource, all of which belong to the scope of this invention so long as the correspondence between the first video resource 35 or the second video resource 37 and a specific terminal display apparatus or a specific terminal video collecting apparatus of a specific conference room can be reflected.

The embodiments of this invention can graphically represent video resources corresponding to terminal display apparatus and terminal video collecting apparatus in each conference room of a video conference, so that users can perceive situations in each conference room visually, and working efficiency can be improved.

Figure 4:
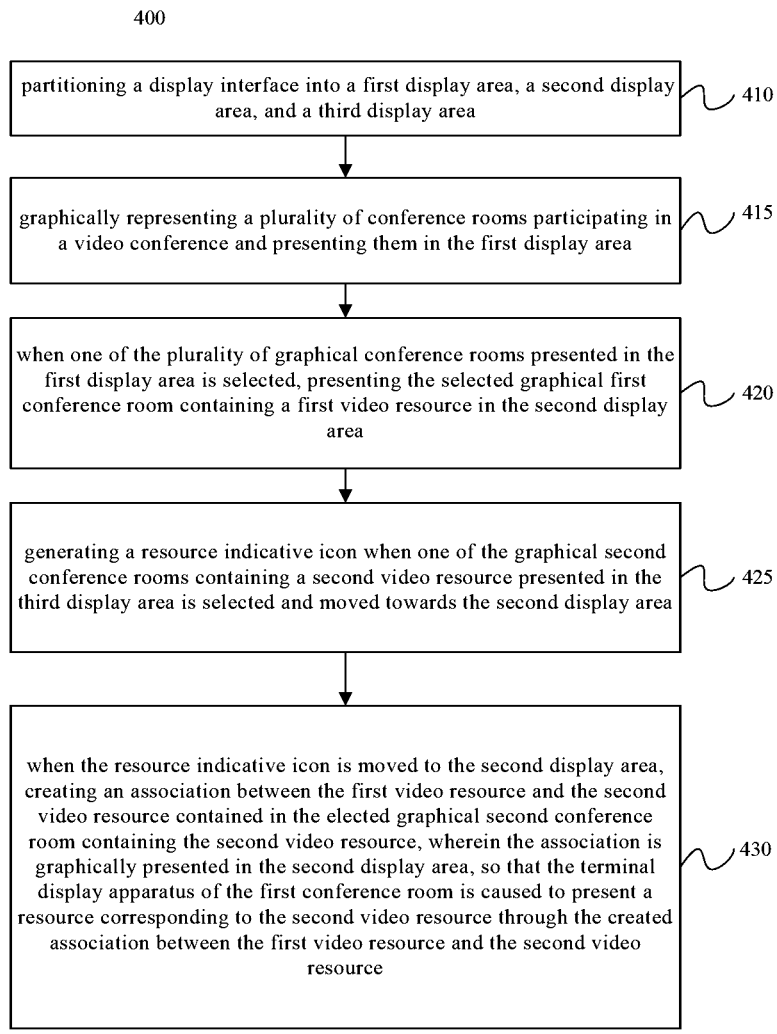
FIG. 4 is a flowchart of a method for video resource management in a video conference according to another embodiment of this invention.

FIG. 4 is a flowchart of a method 400 for video resource management in a video conference according to another embodiment of this invention.

As shown in FIG. 4, the method comprises:

410: partitioning a display interface into a first display area, a second display area, and a third display area.

415: graphically representing a plurality of conference rooms participating in a video conference, and presenting the plurality of graphical conference rooms participating in the videoconference in the first display area.

Steps 410 and 415 in FIG. 4 are identical or similar to steps 21 and 23 of FIG. 2, respectively.

420: when one of the plurality of graphical conference rooms presented in the first display area is selected, presenting a graphical first conference room that is selected containing a first video resource in the second display area.

When a specific conference room is selected, the conference room, which is also called as a first conference room, containing the first video resource can be directly presented in the second display area. As a different implementation, a first conference room containing a first video resource can be presented through selecting a specific conference room and dragging it to the second display area with a mouse event.

425: generating a resource indicative icon when one of the graphical second conference rooms containing second video resource presented in the third display area is selected and moved towards the second display area.

430: when the resource indicative icon is moved to the second display area, creating an association between the first video resource and the selected graphical second video resource contained in the graphical second conference room containing the second video resource, the association being graphically presented in the second display area; causing the terminal display apparatus of the first conference room to present a video resource corresponding to the second video resource through the created association between the first video resource and the second video resource.

Through creating different associations, a second video resource indicative information substituting for the first video resource indicative information can be presented in the second display area to cause the terminal display apparatus of the first conference room to present a video resource corresponding to the second video resource.

Alternatively, the second video resource indicative information and the first video resource indicative information can be alternatively presented in the second display area to cause the terminal display apparatus of the first conference room to present video resources corresponding to the second video resource and the first video resource in an alternative manner.

Alternatively, the second video resource indicative information and the first video resource indicative information can be presented in the second display area in a combined manner to cause the terminal display apparatus of the first conference room to present a combined video resource corresponding to the second video resource and a first video resource.

The embodiments of this invention can graphically represent video resources corresponding to screens and terminal video collecting apparatus in respective conference rooms of a video conference, so that users can perceive situations in the respective conference rooms visually, which simplifies video resource management operations according to graphical video resources, making the grasp of video resource management operations easier, saving operation time, and improving working efficiency.

Figure 5A:
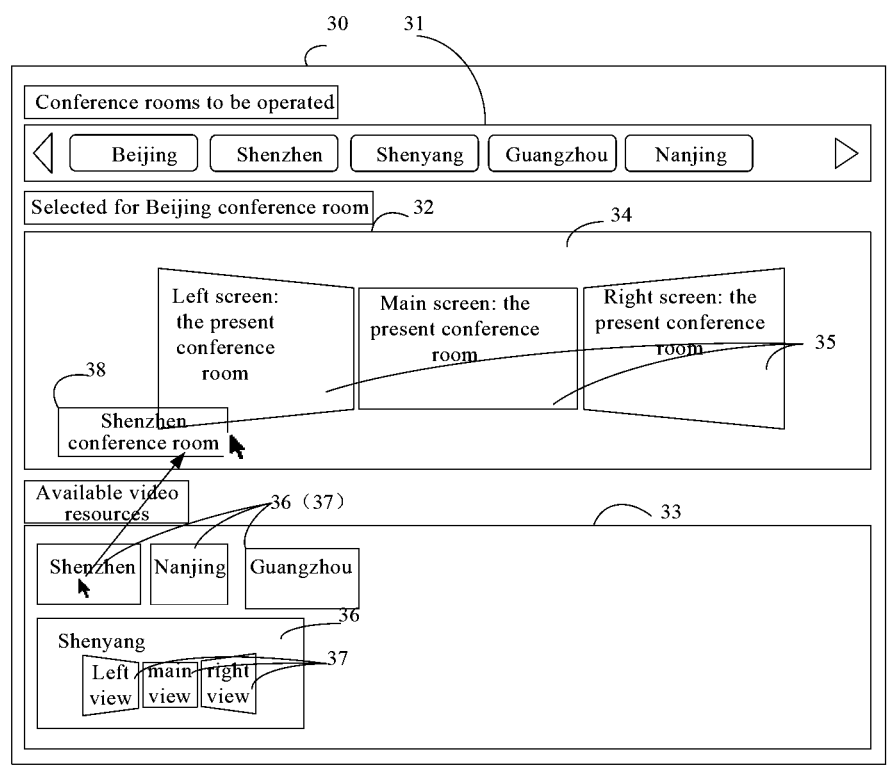
FIGS. 5A-5G are schematic views of the method for video resource management in a video conference according to the another embodiment of this invention.
Figure 5B:
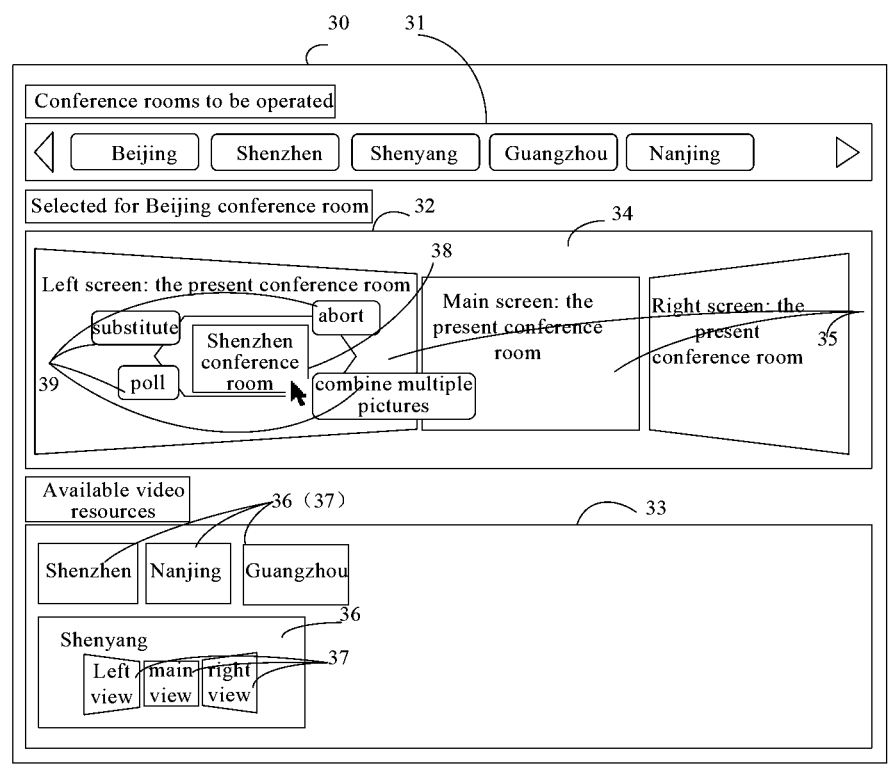
Figure 5C:
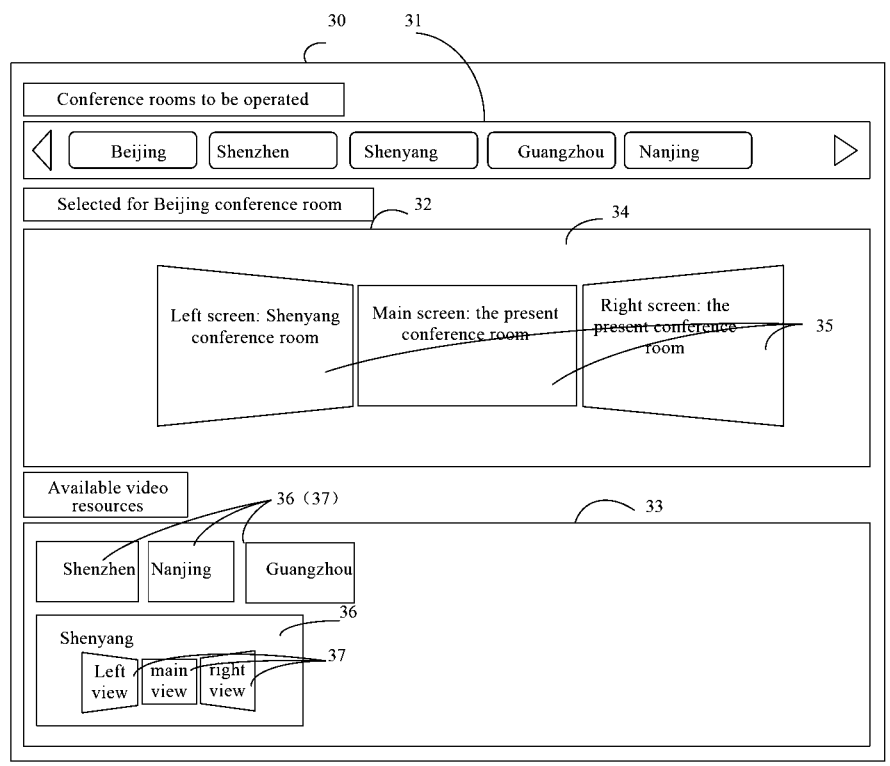

FIGS. 5A-5C are schematic views of the method 400 for video resource management in a video conference according to the another embodiment of this invention. For the convenience of description, only the display interface 30 shown in FIG. 3A is exemplified in those figures.

As shown in FIG. 5A, the display interface 30 is divided into a first display area 31, a second display area 32, and a third display area 33. A plurality of conference rooms are graphically represented and then presented in the first display area 31. Beijing, Shenzhen, Shenyang, Guangzhou, and Nanjing conference rooms are shown in this example respectively as conference rooms participating in a conference.

When the Beijing conference room of the plurality of graphical conference rooms in the first display area 31 is selected, the Beijing conference room and three first video resources 36 contained therein are graphically represented and presented in the second display area 32.

Next, when the graphical Shenzhen conference room containing a second video resource 37 in the third display area 33 is selected and moved towards the second display area 32, a resource indicative icon 38 is generated.

A user may, for example, select the second video resource 37 of the Shenzhen conference room with a mouse or by a touch, select the indicative icon representing the second video resource 37 of the Shenzhen conference room on the display interface 30 (an entity, that is, an element capable of receiving a mouse event) with a mouse. Optionally, when the box of the indicative icon is highlighted, it is indicated that the indicative icon is in a selected state, and the selected indicative icon is moved to a screen position to be managed in the second display area 32 along an arrow direction as shown. For example, if the user wants to display a video resource collected by the terminal video collecting apparatus of the Shenzhen conference room on the left terminal display apparatus of the Beijing conference room, then the box representing the Shenzhen conference room will be dragged to the left screen of the Beijing conference room, that is, to be moved to the position where the first video resource 35 (left screen: the present conference room) is located in the second display area 32.

When the indicative icon is dragged with a mouse by a user, a translucent resource indicative icon 38 will appear on the display interface, a text on the resource indicative icon 38 indicates the name of the second video resource selected by the user. The user drags the translucent resource indicative icon 38 to a screen position to be managed, and then the user may release the mouse to drop the selected resource indicative icon 38. Through the above dragging operations, setting a needed video resource for a specific terminal display apparatus can be realized for specific conference room.

Optionally, as shown in FIG. 5B, when the resource indicative icon 38 has been moved to the second display area 32, options of creating association between the first video resource and the second video resource are fed back.

When the selected resource indicative icon 38 has been released by the user, i.e., a plurality of option buttons 39 representing the associations between the second video resource 37 indicated by the resource indicative icon and the first video resource 35 are presented around the box of the resource indicative icon 38, the option buttons 39 comprise "substitute", i.e., substituting the current displayed content with a video resource content collected by a terminal video collecting apparatus corresponding to the dragged second video resource 37; "abort", i.e., cancelling the current setting and keep the current state unchanged; "poll", i.e., displaying the dragged video content and the current displayed content alternatively with a certain time interval; "combine multiple pictures", i.e., stitching the dragged video content and the current displayed content into a multi-picture display. Preferably, the two options, i.e., "replace" or "abort", may finish the current video resource setting. Optionally, when the resource indicative resource 38 having been dragged to a specified position has not received any subsequent instruments for a period exceeding certain time threshold, the current video resource setting can be finished with a result of displaying the content of the original video resource on the terminal display apparatus corresponding to the first video resource 35, in which a prompt or other features can also be inserted.

As shown in FIG. 5C, when the "substitute" option has been selected, the resource indicative icon 38 and the option buttons 39 attached to the resource indicative icon 38 are no longer displayed. At this moment, the video resource setting is successful; the name of a currently displayed video content can be prompted with text or other distinguishable characterizing element at the screen position that has been set. For example, if the video resource of the left screen of the Beijing conference room has been set to the Shenzhen conference room by a user, a text "Shenzhen conference room" may appear in the element on the interface representing the left screen of the Beijing conference room after the successful setting, wherein, "Shenzhen conference room" is the second video resource indicative information. At that time, the left terminal display apparatus of the Beijing conference room in reality presents a video resource collected by the terminal video collecting apparatus of the Shenzhen conference room.

Herein, "substitute" is selected merely for the convenience of illustration. The result of a selected video resource distribution status is sent to the consolidated conference server, which issues a video resource updating instruction to the terminal display apparatus of the first conference room via the media resource control unit, the media resource processing unit to complete the video resource management.

The embodiments of this invention can graphically represent video resources corresponding to screens and terminal video collecting apparatus in each conference room of a video conference, so that users can perceive situations in each conference room visually, which may simplify video resource management operations according to graphical video resources, making the video resource management operations easier, saving operation time, and improving working efficiency.

Figure 5D:
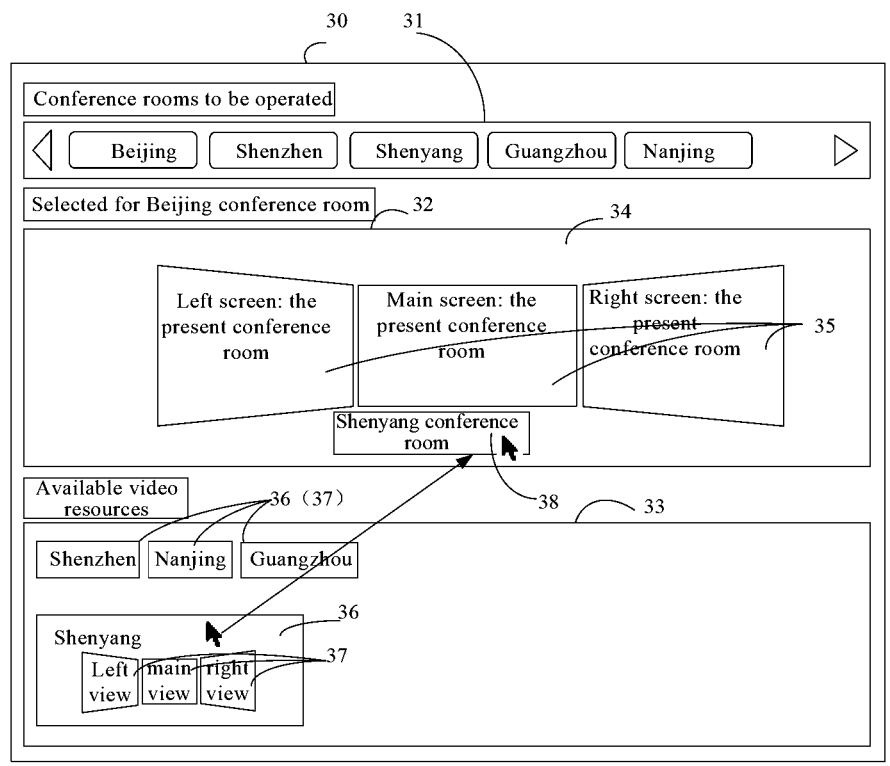
Figure 5E:
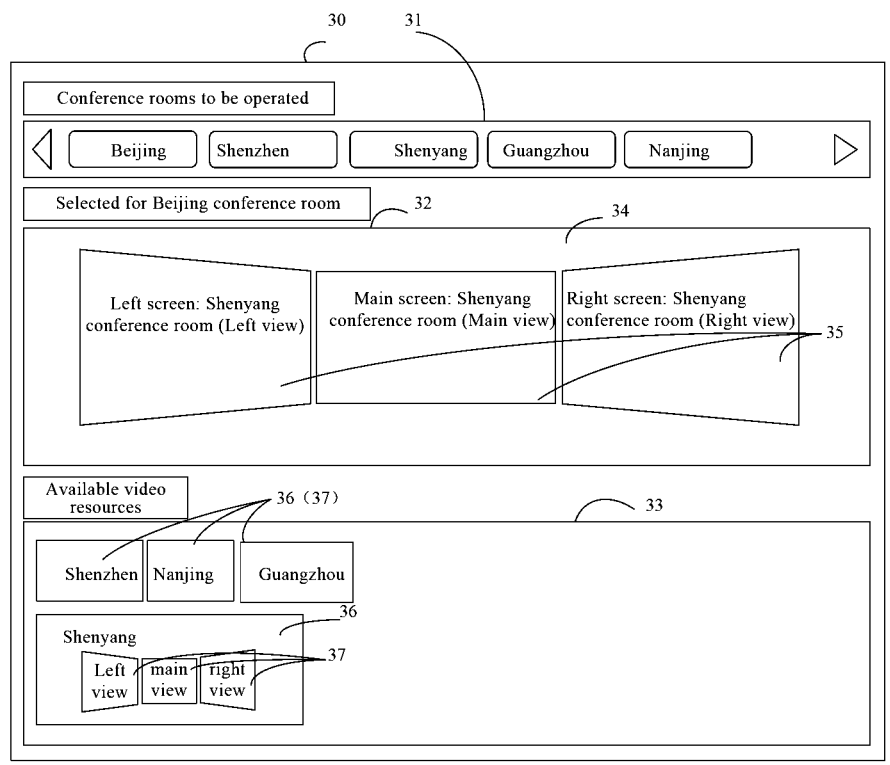

FIGS. 5D-5E are schematic views of the method 50 for video resource management in a video conference according to the another embodiment of this invention.

FIG. 5D differs from FIG. 5A in that, when the second conference room 36, for example, a 3-screen telepresence conference room, has a set of second video resources 37, a user may drag a resource indicative icon 38 representing the whole telepresence conference room to the first conference room 34, to directly select to watch video resources corresponding to this set of second video resources 37 on the terminal display apparatus of the first conference room. As shown in FIG. 5A, the Beijing conference room is a 3-screen telepresence conference room, and a user may want to watch video resources taken by the left, middle, and right terminal video collecting apparatuses of another telepresence conference room, i.e., the Shenyang conference room (in this figure shown as left, main and right views) on the left, middle, right screens of the Beijing conference room, respectively, then the user may select the Shenyang conference room to generate a resource indicative icon 38 representing the Shenyang conference room, and drag it to the Beijing conference room to complete such a setting.

FIG. 5E is a video resource setting result presented after the "substitute" option has been selected.

The embodiments of this invention can graphically represent video resources corresponding to screens and terminal video collecting apparatus in each conference room of a video conference, so that users can perceive situations in each conference room visually, which can simplify video resource management operations according to graphical video resources, making the video resource management operations easier, saving operation time, and improving working efficiency.

Figure 5F:
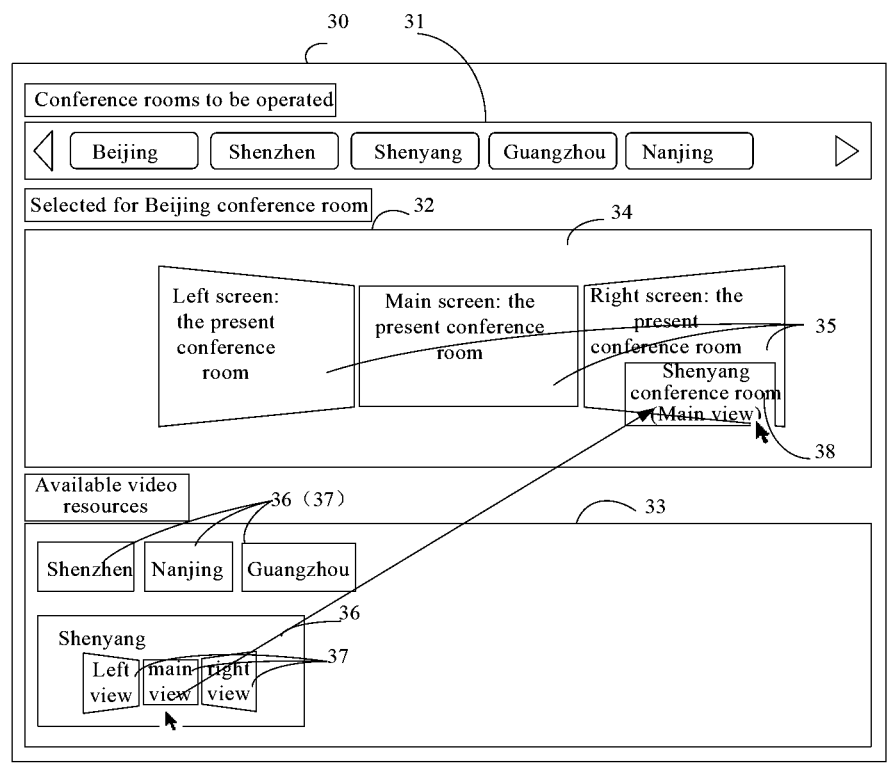
Figure 5G:
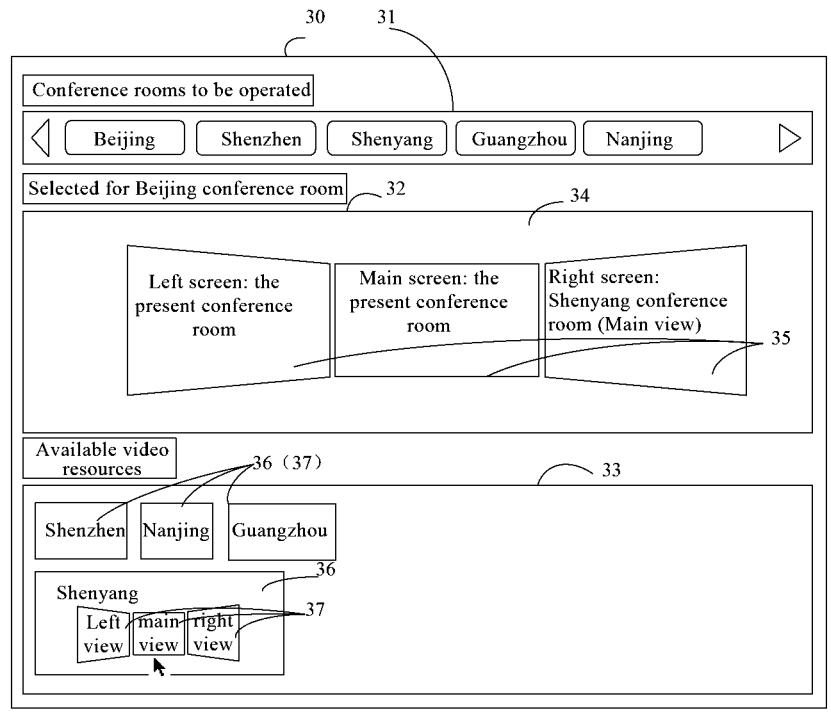

FIGS. 5F-5G are schematic views of the method 60 for video resource management in a video conference according to the another embodiment of this invention.

FIG. 5F differs from FIG. 5A in that, when the second conference room 36 (for example, a 3-screen telepresence conference room) has a set of second video resources 37, a user may directly select and drag one of them to display a video resource corresponding to the second video resources 37 on a specified terminal display apparatus of a specific conference room, for example, a user may set a video resource taken by a terminal video collecting apparatus at the middle position of the Shenyang conference room to the right screen of the Beijing conference room to display.

FIG. 5G is a video resource management result presented after the "substitute" option has been selected.

The embodiments of this invention may graphically represent video resources corresponding to screens or terminal video collecting apparatus in each conference room of a video conference, so that users can perceive situations in each conference room visually, which may simplify video resource management operations according to graphical video resources, making the video resource management operations easier, saving operation time, and insuring smooth proceeding of the conference.

Figure 6:
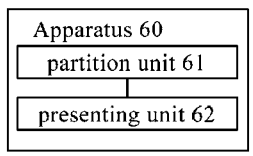
FIG. 6 is a block diagram of an apparatus for video resource management in a video conference according to an embodiment of this invention.

FIG. 6 is a block diagram of an apparatus 60 for video resource management in a video conference according to an embodiment of this invention. As an implementation, the video resource management in a video conference can be performed by a personal computer or other smart devices (such as, a smart phone or a tablet computer or another touch screen device), which may be identical or similar to the device 11 of FIG. 1.

The apparatus 60 comprises a partition unit 61 and a presenting unit 62.

The partition unit 61 partitions a display interface into a first display area, a second display area, and a third display area.

The presenting unit 62 graphically represents a plurality of conference rooms participating in a video conference and presents the plurality of graphical conference rooms participating in the video conference in the first display area partitioned by the partition unit 61; presents a graphical first conference room comprising a first video resource in the second display area partitioned by the partition unit 61, the first conference room being selected from the plurality of graphical conference rooms presented in the first display area; further presents a second graphical conference room comprising a second video resource in the third display area partitioned by the partition unit 61, the second conference room being those of the plurality of graphical conference rooms presented in the first display area except for the graphical conference room that is selected and presented in the second display area, the second video resources presented in the third display area being used to create an association with the first video resource when being selected and moved to the second display area.

The number of the first video resource contained in the graphical first conference room corresponds to the number of terminal display apparatus in the first conference room. The graphical first conference room may comprise a plurality of first video resources.

The number of the second video resource contained in the graphical second conference room also corresponds to the number of terminal video collecting apparatus in the second conference room. The graphical second conference room may comprise a plurality of second video resources.

The embodiments of this invention may graphically represent video resources corresponding to terminal display apparatus and terminal video collecting apparatus in each conference room of a video conference, so that users can perceive situations in each conference room visually, and working efficiency can be improved.

Figure 7:
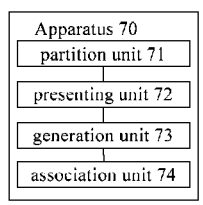
FIG. 7 is a block diagram of another apparatus for video resource management in a video conference according to an embodiment of this invention.

FIG. 7 is a block diagram of another apparatus 70 for video resource management in a video conference according to an embodiment of this invention. The partition unit 71 and the presenting unit 72 of the apparatus 70 are identical or similar to the partition unit 61 and the presenting unit 62 of the apparatus 60, respectively. The apparatus 70 differs from the apparatus 60 in that it further comprises a generation unit 73 and an association unit 74.

The partition unit 71 partitions a display interface into a first display area, a second display area, and a third display area according to preset model parameters of a control interface.

The presenting unit 72 graphically represents a plurality of conference rooms participating in a video conference and presents them in the first display area partitioned by the partition unit 71.

When one of the plurality of graphical conference rooms in the first display area is selected, the presenting unit 72 graphically represents the selected first conference room comprising a first video resource and presents it in the second display area partitioned by the partition unit 71.

When one of the graphical second conference rooms comprising a second video resource in the third display area presented by the presenting unit 72 is selected and moved towards the second display area, the generation unit 73 generates a resource indicative icon.

The association unit 74 creates an association between the first video resource and the second video resource contained in the selected graphical second conference room containing the second video resource when the resource indicative icon generated by the generation unit 73 is moved to the second display area.

The presenting unit 72 graphically presents the association in the second display area, causing the terminal display apparatus of the first conference room to present the corresponding second video resource through the association established between the first video resource and the second video resource.

The apparatus 70 realizes the methods 20 and 400, the details of which will not be described herein.

The embodiment of this invention may graphically represents video resources corresponding to screens and terminal collecting apparatus in each conference room of a video conference, so that users can perceive situations in each conference room visually, which may simplify video resource management operations according to graphical video resources, making the video resource management operations easier, saving operation time, and improving working efficiency.

Furthermore, after creating different associations by the association unit 74, the presenting unit 72 may present second video resource indicative information substituting for first video resource indicative information in the second display area to cause the terminal display apparatus of the first conference room to present a video resource corresponding to the second video resource.

Alternatively, the presenting unit 72 may alternatively present the second video resource indicative information and the first video resource indicative information in the second display area to cause the terminal display apparatus of the first conference room to present video resources corresponding to the second video resource and the first video resource in an alternative manner.

Alternatively, the presenting unit 72 may present the second video resource indicative information and the first video resource indicative information in the second display area in a combined manner to cause the terminal display apparatus of the first conference room to present a combined video resource corresponding to the second video resource and the first video resource.

Those ordinary skilled in the art will recognize that units and algorithm steps of various examples described in conjunction with disclosed embodiments herein can be implemented in electronic hardware, a combination of computer software and electronic hardware. Whether to implement as hardware or software depends on particular applications of technical solutions and design constrains. Those skilled in the art may implement the described functions with different methods for each particular application, which should not be conceived as beyond the scope of this invention.

Those skilled in the art may clearly recognize that for the convenience and concision of description, particular operations of the system, apparatus and units described above may be found in corresponding processes of method embodiments described previously, and will not be repeated herein.

In several embodiments provided in this application, it may recognize that the disclosed systems, apparatus and methods can be implemented by other manners. For example, the above described apparatus embodiment is merely illustrative. For example, the units are merely partitioned by logical function, and other partition manners are also possible in practice, for example, several units or components can be combined or integrated into another system, or some features may be omitted or will not be executed. On the other hand, mutual coupling or direct coupling or communication connection displayed or discussed herein may be indirect coupling or communication connection in electrical, mechanical or other forms through some interfaces, apparatus or units.

Units described as separated components may be or may not be physically separated. The component serving as a display unit may be or may not be a physical unit, that is, it may be located at one position or can be distributed over several network units. Some or all of the units can be selected to realize the purpose of solutions of embodiments herein according to practical needs.

Furthermore, various functional units of various embodiments of this invention may be integrated into a processing unit, or may present individually. Two or more units can be integrated into one unit.

When the described functions are implemented as software function units, and sold or used as a standing alone product, they can be stored in a computer accessible storage medium. Based on such understanding, the technical solutions of the present invention, or the portions contributing to the prior art may be embodied in the form of a software product. The computer software product is stored in a storage medium, and includes several instructions to instruct a computer device (which may be a personal computer, server or network device) to execute all or some of the method steps of embodiments of this invention, the storage medium described above may comprise: a flash disk, a mobile hard disk, Read Only Memory (ROM), Random Access memory (RAM), a magnetic disc, an optical disc or any other mediums that may store program codes.

Detailed above are only exemplary embodiments of the present invention, but the protection scope of the present invention is not limited thereto. Any modification or substitution readily conceivable by those skilled in the art within the scope of the technology disclosed herein shall fall within the protection scope of the present invention. Therefore, the protection scope of the present invention is subject to the appended claims.

What is claimed is:

1. A method for video resource management in video conferencing, comprising:
    partitioning a display interface into a first display area, a second display area, and a third display area;
    identifying a plurality of conference rooms participating in a video conference in the first display area;
    presenting a representation of a first conference room in the second display area, the first conference room being selected from the plurality of conference rooms identified in the first display area, and the representation of the first conference room comprising a representation of a first video resource;
    presenting a representation of a second conference room, in the third display area, wherein the second conference room is one of the plurality of conference rooms identified in the first display area, and wherein the representation of the second conference room comprises a representation of a second video resource;
    creating an association between the first video resource and the second video resource in response to user input corresponding to selection of the representation of the second video resource in the third display area and placement into the second display area.

2. The method according to claim 1, further comprising:
    generating a resource icon in response to user input corresponding to selection of the representation of the second video resource in the third display area and movement towards the second display area;
    wherein the user input corresponding to placement into the second display area further comprises user input corresponding to placement of the resource icon into the second display area;
    wherein the method further comprises:
    presenting the association in the second display area and causing a corresponding terminal display apparatus in the first conference room to present the second video resource based on the created association between the first video resource and the second video resource.

3. The method according to claim 2, further comprising:
    presenting a substitution option in the second display area, wherein user input selecting the substitution option causes the corresponding terminal display apparatus in the first conference room to present the second video resource by substituting the first video resource.

4. The method according to claim 2, further comprising:
    presenting a polling option in the second display area, wherein user input selecting the polling option causes the corresponding terminal display apparatus in the first conference room to present the second video resource and the first video resource in an alternating manner.

5. The method according to claim 2, further comprising:
    presenting a combination option in the second display area, wherein user input selecting the combination option causes the corresponding terminal display apparatus in the first conference room to present the second video resource and the first video resource in a combined manner.

6. The method according to claim 1, wherein the representation of the first conference room in the second display area comprises a plurality of representations of first video resources, each of the plurality of representations of the first video resources having a corresponding terminal display apparatus in the first conference room.

7. The method according to claim 1, wherein the representation of the second conference room in the third display area comprises a plurality of representations of second video resources, each of the plurality of representations of the second video resources having a corresponding terminal video collecting apparatus in the second conference room.

8. A non-transitory computer-readable medium having processor-executable instructions stored thereon for video resource management in video conferencing, the processor-executable instructions, when executed by a processor, causing the following steps to be performed:

partitioning a display interface into a first display area, a second display area, and a third display area;

identifying a plurality of conference rooms participating in a video conference in the first display area;

presenting a representation of a first conference room in the second display area, the first conference room being selected from the plurality of conference rooms identified in the first display area, and the representation of the first conference room comprising a representation of a first video resource;

presenting a representation of a second conference room, in the third display area, wherein the second conference room is one of the plurality of conference rooms identified in the first display area, and wherein the representation of the second conference room comprises a representation of a second video resource;

creating an association between the first video resource and the second video resource in response to user input corresponding to selection of the representation of the second video resource in the third display area and placement into the second display area.

9. The non-transitory computer-readable medium of claim 8, wherein the steps further comprise:

generating a resource icon in response to user input corresponding to selection of the representation of the second video resource in the third display area and movement towards the second display area;

wherein the user input corresponding to placement into the second display area further comprises user input corresponding to placement of the resource icon into the second display area;

wherein the steps further comprise:

presenting the association in the second display area and causing a corresponding terminal display apparatus in the first conference room to present the second video resource based on the created association between the first video resource and the second video resource.

10. The non-transitory computer-readable medium of claim 9, wherein the steps further comprise:

presenting a substitution option in the second display area, wherein user input selecting the substitution option causes the corresponding terminal display apparatus in the first conference room to present the second video resource by substituting the first video resource.

11. The non-transitory computer-readable medium of claim 9, wherein the steps further comprise:

presenting a polling option in the second display area, wherein user input selecting the polling option causes the corresponding terminal display apparatus in the first conference room to present the second video resource and the first video resource in an alternating manner.

12. The non-transitory computer-readable medium of claim 9, wherein the steps further comprise:

presenting a combination option in the second display area, wherein user input selecting the combination option causes the corresponding terminal display apparatus in the first conference room to present the second video resource and the first video resource in a combined manner.

13. The non-transitory computer-readable medium of claim 8, wherein the representation of the first conference room in the second display area comprises a plurality of representations of first video resources, each of the plurality of representations of the first video resources having a corresponding terminal display apparatus in the first conference room.

14. The non-transitory computer-readable medium of claim 8, wherein the representation of the second conference room in the third display area comprises a plurality of representations of second video resources, each of the plurality of representations of the second video resources having a corresponding terminal video collecting apparatus in the second conference room.

* * * * *